United States Patent [19]

Engle

[11] Patent Number: 4,545,465
[45] Date of Patent: Oct. 8, 1985

[54] ACTUATORS FOR DISC BRAKE CALIPERS
[75] Inventor: Thomas H. Engle, Cape Vincent, N.Y.
[73] Assignee: General Signal Corporation, Stamford, Conn.
[21] Appl. No.: 589,367
[22] Filed: Mar. 14, 1984
[51] Int. Cl.[4] .............................................. F16D 59/02
[52] U.S. Cl. .................................. 188/72.3; 188/71.9; 188/216
[58] Field of Search .................... 188/71.8, 71.9, 72.3, 188/170, 196 D, 196 V, 216

[56] References Cited
U.S. PATENT DOCUMENTS 3,661,230 5/1972 Burnett ........................... 188/72.3 X
3,842,949 10/1974 Newstead ....................... 188/72.3 X Primary Examiner—Duane A. Reger
Attorney, Agent, or Firm—Thomas R. FitzGerald; Harold S. Wynn

[57] ABSTRACT

An actuator for a disc brake caliper comprises a spring operable piston for applying pressure to the disc brake caliper when rendered effective through a self adjusting lead screw, one end of which is friction coupled to the piston to prevent rotation of the lead screw when the brakes are applied. A manual release screw is threaded through the piston to bear against the head of the lead screw through an anti-friction bearing when manual release is desired to at least partially release pressure of the piston on the head of the lead screw through the friction coupling to permit slippage in the friction coupling connection between the piston and the head of the lead screw and cause the piston to rotate the lead screw in a direction to permit release of the brakes.

7 Claims, 2 Drawing Figures

ACTUATORS FOR DISC BRAKE CALIPERS

REFERENCE TO PRIOR ART

This invention is related to prior U.S. Pat. Nos. 3,833,095, and 4,018,140, assigned to the same assignee as the present invention, and U.S. Pat. No. 4,399,894. These patents are in part incorporated herein by reference for defining the background of the material for the present disclosure.

BACKGROUND OF THE INVENTION

The present invention relates to actuators for disc brake calipers, and it more particularly pertains to a system for manually releasing spring applied brake applications.

In the prior Engle U.S. Pat. No. 4,018,140, an actuator for disc brakes is disclosed having spring applied emergency brakes wherein Belleville springs are normally compressed by fluid in a chamber on one side of an emergency piston. Upon release of fluid from the chamber, disc brakes are applied by spring actuated movement of the emergency piston. Provision is made for hand operated release of the emergency brake application in case of loss of availability of fluid pressure to release the brakes. This is accomplished by threading a retraction screw into the emergency piston to cause the Belleville springs to be compressed mechanically to the same extent as by fluid pressure operation of the piston.

In a typical example of manual release of a spring brake application in the system according to the above patent, manually exerted force in rotating the retraction screw is large because of the spring load to be overcome, which is approximately 11,500 lbs.

An object of the present invention is to provide an improved system for manually releasing spring applied brake applications which substantially obviates one or more of the limitations and disadvantages of the described prior art systems.

Another object of the present invention is to materially reduce the force required to manually release a spring disc brake application.

Other objects, purposes and characteristic features of the present invention will be in part obvious from the accompanying drawings, and in part pointed out as the description of the invention progresses.

SUMMARY OF THE INVENTION

An actuator for a disc brake caliper according to a preferred embodiment of the present invention comprises a cylindrical housing containing caliper actuating apparatus having a piston subject to axial actuation in one direction by release of pressure of coaxial springs to actuate the caliper to a brake application position, the piston being subject to actuation in the opposite direction to compress the springs and to actuate the caliper to a release position. Threaded slack adjusting apparatus coaxial with the piston is provided for adjustably connecting the piston to the caliper, comprising a rotatable lead screw coaxial with the piston, threaded within a nut carried by an actuating shaft, the lead screw being operably connected to the piston through cooperating friction surfaces on the piston and on a head of the lead screw respectively.

Manual release apparatus is provided for actuating the caliper from an application position to a release position. A manually operable quick release screw is coaxial with the piston and lead screw and is threaded through a portion of the piston, with one end normally spaced a small distance from the head of the lead screw, and having its other end extending outside of the housing and being adapted for manual rotation. When the release screw is actuated, it has a low friction axial connection with the head of the lead screw, while the area of the lead screw that contacts the piston has a relatively large friction area so that the axial force of the springs upon the piston engages the piston with the head of the lead screw with sufficient friction to normally prevent the rotation of the lead screw upon axial movement of the piston in application of the brakes. To manually release the brakes, when fluid pressure in not available for release in the normal manner, the release screw is manually threaded through the piston to contact the head of the lead screw. This contact is preferably made through an anti-friction bearing to reduce friction connection between the release screw and the head of the lead screw. As the release screw is tightened, it provides a multiple connection from the piston to the head of the lead screw for transfer of forces from the springs to the disc brake. As the release screw is tightened, the friction force connection resisting turning between the piston and the lead screw is decreased because of the reduction of the force transmitted through this connection, until the friction connection between the piston and the head of the lead screw is insufficient to prevent driving of the slack adjusting lead screw in a reverse direction. Then the lead screw becomes rotated by reason of the force of the springs driving the piston to rotate the lead screw in a direction to shorten the threaded slack adjustment connection and thus permit full expansion of the springs and release of force applied to the brakes. When fluid pressure is again restored to the system, the springs can be compressed by fluid pressure to restore the actuator to its normal position by movement of the piston to compress the Belleville springs. Repeated release and application cycles may be required to fully extend the slack adjustment.

For a better understanding of the present invention, together with other and further objects thereof, reference is had to the following description, taken in connection with the accompanying drawings, while its scope will be pointed out in the appending claims.

Figures 1, 2:
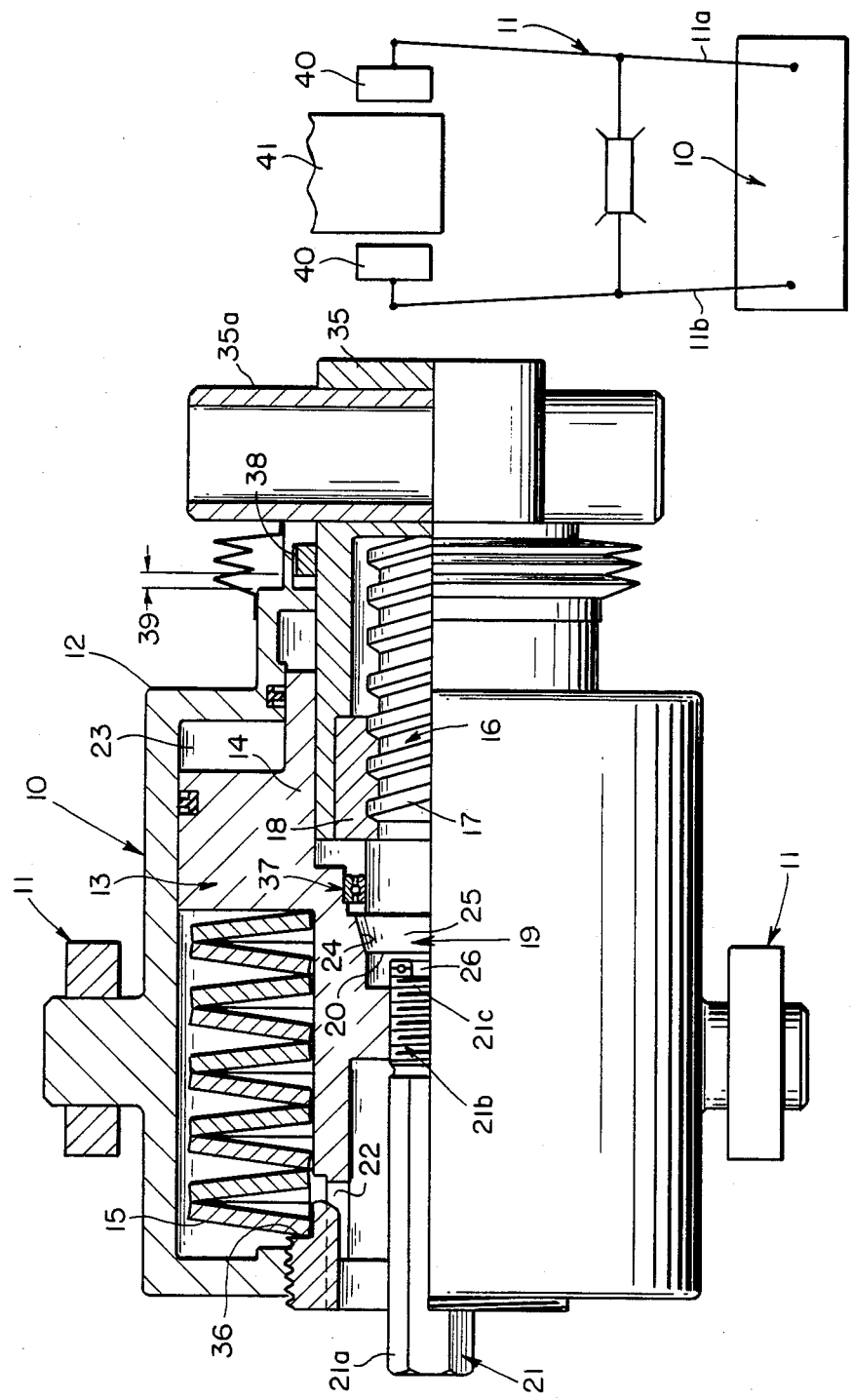
FIG. 1 is an elevational view, shown partly in cross section, of a disc brake actuator mechanism according to a preferred embodiment of the present invention.
FIG. 2 illustrates diagrammatically connection of the actuator of FIG. 1, through a caliper to shoes of a disc brake.

With reference to FIG. 1, an actuator 10 is provided for operating a disc brake caliper 11 (see FIG. 2), the actuator 10 comprising a cylindrical housing 12 containing caliper actuating means 13 having a piston 14 subject to axial actuation in one direction by release of pressure on coaxial Belleville springs 15 to actuate the disc brake caliper 11 to a brake application position, the piston 14 being subject to actuation in the opposite direction by fluid pressure to compress the springs 15 and actuate the caliper 11 to a release position. Threaded slack adjusting means 16 is coaxial with the piston 14 for adjustably connecting the piston 14 to the caliper 11. The slack adjusting means 16 comprises a rotatable lead screw 17 coaxial with the piston 14 and threaded with a helical angle great enough to be nonself-locking through a nut 18 that is fixed against rotation and carried by an actuating shaft 35 for operably connecting the piston 14 through friction clutch connection means 19 to a head end 20 of lead screw 17.

Manual release means 21 is provided for actuating the caliper 11 from an application position to a release position, upon loss of fluid pressure for releasing the brakes in a normal manner. The piston 14 is prevented from rotating by a suitable key 22, but is permitted to move axially in accordance with fluid pressure in a chamber 23 to the right of the piston. The piston 14 has a conical friction surface 24 cooperating with a complimentary conical surface 25 on a tapered head 25 of slack adjusting screw 17.

The release screw 21 has a head 21a extending outside of the housing 12, is threaded through piston 14 at 21b, and carries, at the right hand end 21c thereof, an antifriction thrust bearing 26 for permitting free rotation of the lead screw 17 relative to the release screw 21 when pressure is applied to the head end 20 of lead screw 17 by the threading of the release screw 21 against the head 20 of screw 17 for a manual release of the brakes. The nut 18 of the slack adjustment mechanism 16 is contained in an inner recess of an actuator shaft 35 that is also adapted at 35a to be connected to an arm (not shown) of the caliper 11.

In operation, the actuator 10 operates caliper 11 (see FIG. 2) to a release position by normally pressurizing chamber 23 (see FIG. 1). This actuates the piston 14 to the left and compresses Belleville springs 15 against abutment 36. As the piston 14 moves to the left, a bearing 37 carried by the piston 14 presses against the bottom of the head 25 of lead screw 17, pulling the lead screw 17 to the left along with its nut 18 and the actuator shaft 35. Shaft 35 is also being urged to the left by arms of the caliper 11 as they move inwardly during release of the brakes.

Upon movement of actuator shaft 35 to the left, a friction ring 38 is drawn with the shaft 35 until clearance 39 has been closed. This clearance 39 represents the extent of travel of the actuating shaft 35. The friction ring 38 will prevent further left hand movement of the actuator shaft 35 because it is a friction fit on the actuator shaft 35. Antifriction bearing 37 permits rotation of the lead screw 17 as the piston 14 continues its left hand movement. This extends the adjustable connection 16, disposed between the piston 14 and the actuator shaft 35, until the Belleville springs 15 have been actuated to their fully compressed positions to provide slack adjustment. It will be noted that the release screw 21, in its normal position, is spaced a small distance away from the head 25 of the lead screw 17. This clearance is maintained throughout the normal application and release of the brakes.

To apply the brakes, fluid pressure in chamber 23 is reduced to an extent dependent upon the degree of braking that has been manually designated. The Belleville springs 15 move the piston 14 to the right and spread the arms 11a and 11b (see FIG. 2) of caliper 11. This applies braking pressure until sufficient force is built up on the caliper 11, which, when combined with the pressure in chamber 23, is sufficient to balance the force of the Belleville springs 15. Further reduction in the fluid pressure of chamber 23 will lead to a further increase in braking force applied through the caliper 11. The complete loss of fluid pressure in chamber 23, as when the car is shut down, results in a maximum braking force being applied by the actuator 10.

EMERGENCY RELEASE

To release the actuator in an emergency where fluid pressure cannot be applied to chamber 23, quick release screw 21 is rotated to the right and threaded through the piston 14 at 21b until the right hand end 21c of release screw 21 applies part of the force of springs 15, through piston 14 and through bearing 26 to the left hand end 20 of the lead screw 17. This now provides a multiple path for conveying part of the force of springs 15, through piston 14 to lead screw 17 to relieve some of the spring application force applied through clutch 19 to lead screw 17. As the release screw 21 continues to be rotated, the force of the springs 15 on the lead screw 17 is shifted from being transmitted through clutch 19 to the lead screw 17 to being transmitted through release screw 21 to the lead screw 17, until there is no longer enough friction in the clutch 19 to prevent driving the slack adjustment in reverse by rotation of lead screw 17.

As screw 21 is threaded into the piston 14, the force it applies to the lead screw 17 reduces the friction engagement in clutch 19 between piston 14 and conical head 25 of lead screw 17 sufficiently to permit the piston 14 to drive the lead screw 17 into rotation in a direction to be threaded into the nut 18. Once this rotation begins, the total force exerted on the lead screw 17 by the springs 15 decreases, due to expansion of the springs 15, thus further decreasing the load on the friction surfaces 24 and 25 of the piston 14 and the lead screw 17 respectively. This allows greater freedom of rotation, and further spring 15 force reduction in a cascade effect, which must always result in an expansion of springs 15, to drive piston 14 to a full manual release position with total release of force applied from springs 15 to the lead screw 17. When the springs 15 are fully expanded, and the slack adjusting lead screw 17 is retracted within nut 18, the braking force is relieved by permitting shoes 40 to expand from their contact with disc 41 to drive the actuating shaft 35 to the left within the caliper 11.

After fluid pressure has been restored to the system, the actuator 10 can be restored to its normal release position by backing off the release screw 21 to provide a small clearance between the bearing 26 and the left hand end 20 of the lead screw 17. Release pressure is now applied to the chamber 23 to move the piston 14 to the left to compress the springs 15. Several application and release cycles may be required to fully extend the lead screw 17 to compensate for wear in the brake pads.

It will be noted that, during emergency release, the full force of springs 15 need not be compressed by the release screw 21, but only sufficient force is required to permit slippage in the clutch 19.

BRAKE SHOE CHANGE

To change the brake shoes, the brakes are first applied and then released by the use of the release screw as has been described to permit expansion of the springs 15 as has been described for manual release of the brakes. With the brakes released in this manner, the actuating shaft 35 can be forced to the left, and the brake pads can be changed. After the pads have been changed, the brakes should be applied and released a sufficient number of times by alternate pressurization of chamber 23 to take up all of the slack and establish proper brake shoe clearances.

Having thus described an actuator for disc brake calipers as a preferred embodiment of the present invention, it is to be understood that various modifications and alterations may be made to the specific embodiment shown, without departing from the spirit or scope of the present invention.

What is claimed is:

1. An actuator for a disc brake caliper comprising a cylindrical housing containing caliper actuating means having a piston subject to axial actuation in one direction by release of pressure of coaxial springs to actuate the disc brake caliper to a brake application position, the piston being subject to actuation in the opposite direction to compress the springs to actuate the caliper to a release position, threaded slack adjusting means coaxial with the piston for adjustably connecting the piston to the caliper comprising a rotatable lead screw coaxial with the piston threaded within a non-rotatable nut and operably connected to the piston through friction clutch connection means at one end of the lead screw, and manual release means for permitting actuation of the caliper from an application position to a release position, wherein improved manual release means comprises:

(a) means for securing the piston against rotation,
   (b) manual release means including a release screw coaxial with the lead screw and extending outside of the housing at one end, and having its other end normally spaced a small distance away from said one end of the lead screw for manually releasing a brake application,
   (c) the release screw being threaded through a portion of the non-rotatable piston, and
   (d) means subject to rotation of the release screw to bear upon said one end of the lead screw for manually releasing the calipers from a brake application position by shifting to the release screw part of the brake applying force normally transmitted from the springs through the clutch, and thereby from the springs to cause slippage in the clutch to drive the slack adjusting means in a direction to permit full release of the brakes.

2. An actuator for a disc brake caliper according to claim 1 wherein means is provided for selectively applying force of the springs to the head of the lead screw through one or both of two pressure couplings, dependent upon whether or not the release screw is actuated.

3. An actuator for a disc brake caliper according to claim 1 wherein brake applying force is normally applied to the head of the lead screw through a first friction coupling for brake application and the manual release means is operable to reduce friction to the point of slippage in the first friction coupling.

4. An actuator for a disc brake caliper according to claim 3 wherein the manual release means comprises a release screw for diverting spring pressure away from the first friction coupling without compressing the springs.

5. An actuator for a disc brake caliper according to claim 4 wherein the manual release means comprises a second coupling through which brake applying force is applied from the springs to the head of the lead screw, the second coupling comprising an anti-friction bearing.

6. An actuator for a disc brake caliper comprising a cylindrical housing containing caliper actuating means having a piston subject to axial actuation in one direction by release of pressure of coaxial springs to actuate the disc brake caliper to a brake application position, the piston being subject to actuation in the opposite direction to compress the springs to actuate the caliper to a release position, threaded slack adjusting means coaxial with the piston for adjustably connecting the piston to the caliper comprising a rotatable lead screw coaxial with the piston threaded within a non-rotatable nut and operably connected to the piston through friction clutch connecting means, and, (a) manual release means comprising a release screw for diverting force of the springs away from the friction coupling to an extent to permit slippage in the friction clutch to rotate the lead screw to shorten the slack adjustment and permit full expansion of the springs, whereby a brake application can be released by actuation of the release screw without compressing the springs.

7. An actuator for a disc brake caliper according to claim 6 wherein the manual release screw is coupled to the lead screw through an anti-friction bearing.

* * * * *